(12) United States Patent
Murray et al.

(10) Patent No.: US 7,729,802 B2
(45) Date of Patent: Jun. 1, 2010

(54) AUTOMATED SUPPORT MEMBER INSTALLATION STATION

(75) Inventors: Michael T. Murray, Longmont, CO (US); Shawn A. Ruden, Longmont, CO (US); John W. Rigsby, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 1083 days.

(21) Appl. No.: 11/349,803

(22) Filed: Feb. 8, 2006

(65) Prior Publication Data

US 2007/0185616 A1 Aug. 9, 2007

(51) Int. Cl.
*G06F 19/00* (2006.01)
(52) U.S. Cl. ...................................................... 700/245
(58) Field of Classification Search ............. 700/60–62, 700/95, 192, 213, 217, 219, 220, 222, 228, 700/242–245, 258–260, 262; 901/44, 46, 901/47
See application file for complete search history.

(56) References Cited

U.S. PATENT DOCUMENTS

| | | | |
|---|---|---|---|
| 5,150,512 A | 9/1992 | Hatchett et al. | |
| 5,347,414 A | 9/1994 | Kano | |
| 5,540,542 A | 7/1996 | Krajec et al. | |
| 5,692,289 A | 12/1997 | Amada et al. | |
| 5,826,325 A | 10/1998 | Price et al. | |
| 5,984,104 A | 11/1999 | Schott et al. | |
| 5,987,735 A | 11/1999 | Horning et al. | |
| 6,049,969 A | 4/2000 | Jenkins et al. | |
| 6,094,804 A | 8/2000 | Chuang et al. | |
| 6,105,240 A | 8/2000 | Chuang et al. | |
| 6,163,439 A | 12/2000 | Jeong | |
| 6,212,759 B1 | 4/2001 | Liu et al. | |
| 6,295,717 B1 | 10/2001 | Chuang et al. | |
| 6,385,507 B1 * | 5/2002 | Buijtels | 700/245 |
| 6,577,473 B1 | 6/2003 | Macpherson et al. | |
| 2004/0180450 A1 * | 9/2004 | Bass et al. | 436/180 |

* cited by examiner

*Primary Examiner*—Kim T Nguyen
(74) *Attorney, Agent, or Firm*—Fellers, Snider, et al.

(57) ABSTRACT

Method and apparatus for installing a support member to support a flexible element, such as a shipping comb used to support a flexible suspension assembly of a head-stack assembly (HSA). A robotic end effector configured to insert the support member to bias the flexible element. Prior to said insertion, an inspection assembly verifies at least one physical parameter of the member while the member is supported by the end effector. One or more computerized video images along at least one axis are preferably obtained by the inspection assembly, and machine readable code on the member is preferably decoded from said image(s). The end effector preferably includes a pair of opposing gripper fingers which engage the support member with variable compressive force during insertion. A cleaning assembly preferably cleans the support member prior to insertion, and a subsequent video image is preferably obtained after insertion to verify installation of the member.

20 Claims, 8 Drawing Sheets

AUTOMATED SUPPORT MEMBER INSTALLATION STATION

FIELD OF THE INVENTION

The claimed invention relates generally to the field of automated manufacturing and more particularly, but not by way of limitation, to an apparatus and method for installing a support member to support a flexible element, such as a shipping comb installed onto a head stack assembly (HSA) to temporarily support at least one data transducer of the HSA.

BACKGROUND

Data storage devices are used to access computerized data in a fast and efficient manner. The data are stored on storage media, such as one or more axially aligned magnetic recording discs accessed by a corresponding array of data transducers.

A moveable actuator, also referred to as a head stack assembly (HSA), can be used to controllably advance the transducer(s) adjacent the media. In a disc drive data storage device, the transducers are often supported by flexible suspension assemblies (flexures) which in turn are mounted to rigid actuator arms. The arms are configured for pivotal movement about a pivot bearing assembly located adjacent an outermost diameter of the media.

The HSA further supports a coil which is immersed in a magnetic circuit of a voice coil motor. The application of controlled voltage across the coil generates a magnetic field that interacts with the magnetic circuit. This induces rotation of the actuator body about the pivot bearing assembly, and radial movement of the transducers across the media surfaces.

It is generally desirable to handle the HSA with extreme care during manufacturing and installation to reduce the potential for damage to the transducers and the flexures. A shipping comb is often installed to provide temporary support of the respective transducers after the HSA has been assembled. The shipping comb is usually designed to remain in place until such time that the HSA is installed onto a data storage device base deck and the transducers are merged with the media.

With continued advancements in the art, there is a continual need for improvements in the manner in which shipping combs can be reliably and efficiently installed onto head stack assemblies, and it is to these and other improvements that preferred embodiments of the present invention are generally directed.

SUMMARY OF THE INVENTION

Preferred embodiments of the present invention are generally directed to an apparatus and method for installing a support member to support a flexible element, such as but not limited to a shipping comb used to support a flexible suspension assembly of a head-stack assembly (HSA).

In accordance with preferred embodiments, a robotic end effector is configured to insert the support member to bias the flexible element. An inspection assembly is coupled to the end effector and which, prior to said insertion, verifies at least one physical parameter of the member while the member is supported by the end effector.

Preferably, the inspection assembly comprises a vision system which obtains a computerized video image of the support member along at least one axis. The vision system preferably further decodes a machine readable code on the support member from said video image. The vision system further preferably obtains a video image of the support member after insertion by the end effector.

A singulation assembly is preferably provided to individually present each of a population of nominally identical ones of the support member to the end effector. A motor preferably advances the end effector to insert the support member into a rigid arm that supports the flexible element. A controller preferably provides top level control and monitors current applied to said motor during said insertion.

The end effector preferably comprises a pair of opposing gripper fingers which engage an engagement member portion of the support member. A respective pair of sliders provide limited compliance in an axial direction in which the fingers extend (e.g., the z-axis).

Preferably, the gripper fingers initially engage the engagement member with a selected compressive force and subsequently move apart to allow the support member to gimbal during installation while the support member remains supported by the gripper fingers.

A cleaning assembly preferably performs a cleaning operation upon the support member while the end effector supports the support member and prior to installation of said support member. A discard mechanism preferably removes the support member from the end effector when the support member is determined to be non-compliant.

These and various other features and advantages which characterize the claimed invention will become apparent upon reading the following detailed description and upon reviewing the associated drawings.

DETAILED DESCRIPTION

Figure 1:
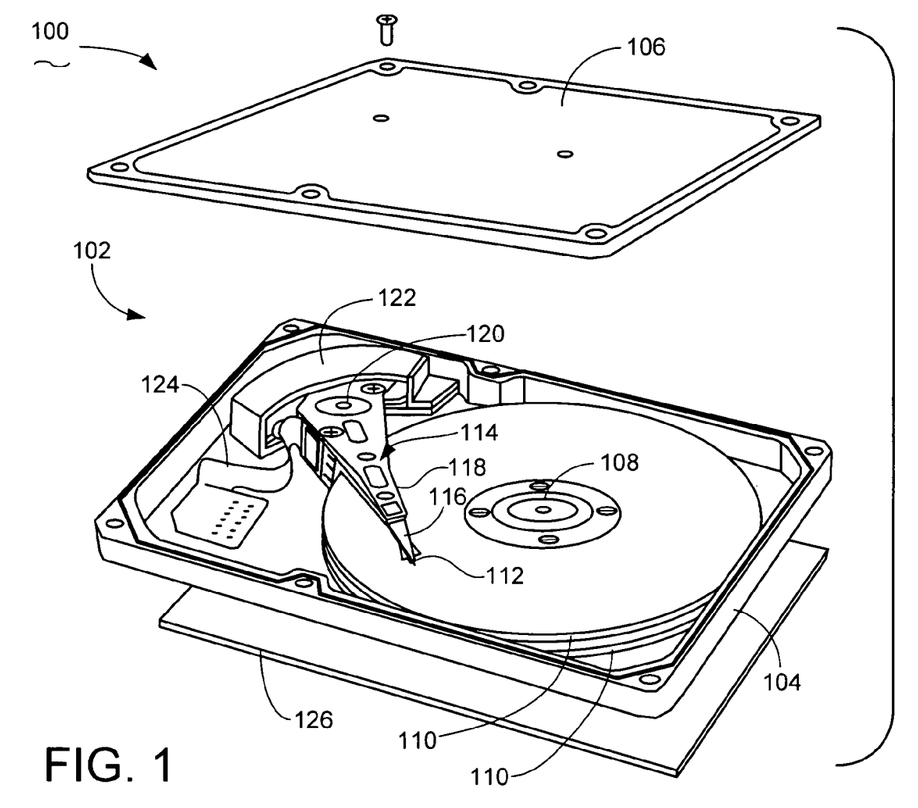
FIG. 1 is an exploded view of a data storage device constructed and operated in accordance with preferred embodiments of the present invention.

FIG. 1 shows an exploded view of a data storage device 100 to provide an exemplary environment in which preferred embodiments of the present invention can be advantageously practiced. The device 100 is preferably characterized as a hard disc drive of the type used to store and retrieve digital data in a host system or device.

The device 100 includes a rigid, environmentally controlled housing 102 formed from a base deck 104 and a top cover 106. A spindle motor 108 is mounted within the housing 102 to rotate a number of data storage media 110 at a relatively high speed.

Data are arranged on the media 110 in concentric tracks which are accessed by a corresponding array of data transducing heads 112. The heads 112 (transducers) for a portion of a head stack assembly (HSA) 114. The HSA 114, or actuator, includes a plurality of flexible suspension assemblies (flexures) 116 which extend from an associated number of rigid actuator arms 118. A head 112 is preferably supported at the distal end of each flexure 116, as shown.

The HSA 114 is configured for rotation about a pivot bearing assembly 120 through application of a control voltage to a voice coil motor (VCM) 122. A flex circuit assembly 124 electrically connects the heads 112 and VCM 122 of the HSA 114 with control circuitry on an externally mounted printed circuit board, PCB 126.

As explained in greater detail below, the HSA 114 is preferably characterized as a stacked assembly formed from a number of stamped actuator arms and spacers, although such is not limiting.

Figure 2:
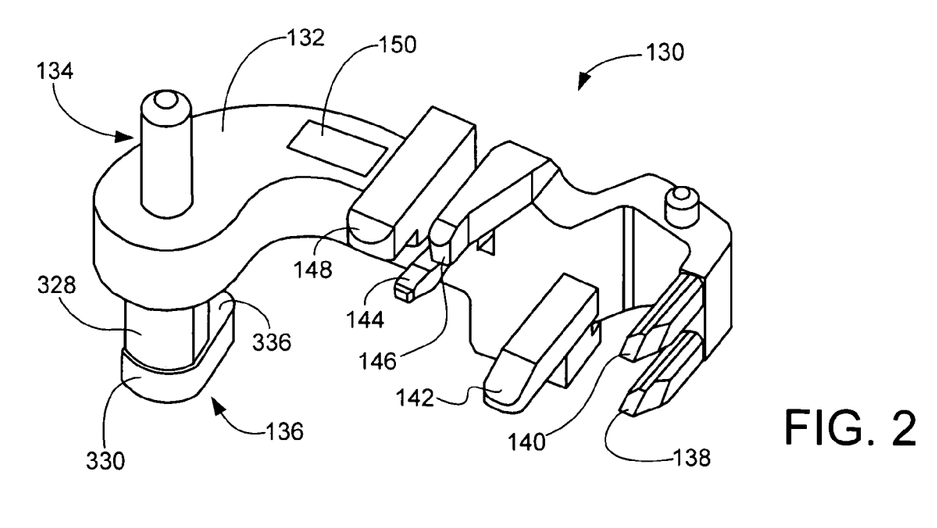
FIG. 2 is an isometric representation of a shipping comb utilized in accordance with preferred embodiments of the present invention.

A shipping comb 130 is depicted in FIG. 2. The shipping comb 130, also referred to herein as a support member, is preferably used during manufacturing of the device 100 to temporarily support the transducers 112 after HSA fabrication and prior to HSA installation.

The particular configuration of the shipping comb 130 will generally be adapted to the requirements of a given application, so that the shipping comb 130 as shown in FIG. 2 is generally illustrative of a preferred embodiment and is not limiting.

The comb 130 is preferably formed from a suitable strong, nonmarring and nonparticulating material such as injection molded plastic. As shown in FIG. 2, the comb 130 includes curvilinearly extending body 132. An insertion pin 134 and an engagement member 136 extend in opposing directions from a proximal end of the body 132. Flexure support arms 138, 140 are supported at a distal end of the body 132. A number of HSA engagement arms, numerically denoted at 142, 144, 146 and 148, serve to guide and/or retain the comb 130 onto the HSA.

Machine readable information is preferably provided on the comb 130 at 150. The information is associated with the comb 130 and can include lot or mold data associated with the fabrication of the comb 130, product or version data associated with the HSA 114, etc. The information can also comprise a serial number or other indicator that uniquely identifies each comb.

The information is preferably encoded using two-dimensional (2D) bar coding techniques. The information can be molded, etched or otherwise formed as a portion of the comb 130, and/or can be subsequently applied to the comb 130 using an adhesive label. Portions of the information can further be distributed along different surfaces of the comb 130.

The device 100 of FIG. 1 is preferably formed in an automated assembly environment wherein a large population of nominally identical devices are assembled each day. It is contemplated that advanced manufacturing techniques are employed whereby pallets are directed via conveyors through the manufacturing facility to a number of consecutive assembly stations. Specific assembly and/or testing operations are carried out at each station so that the devices are progressively assembled in an automated fashion as the pallets move along the conveyor lines.

Figure 3:
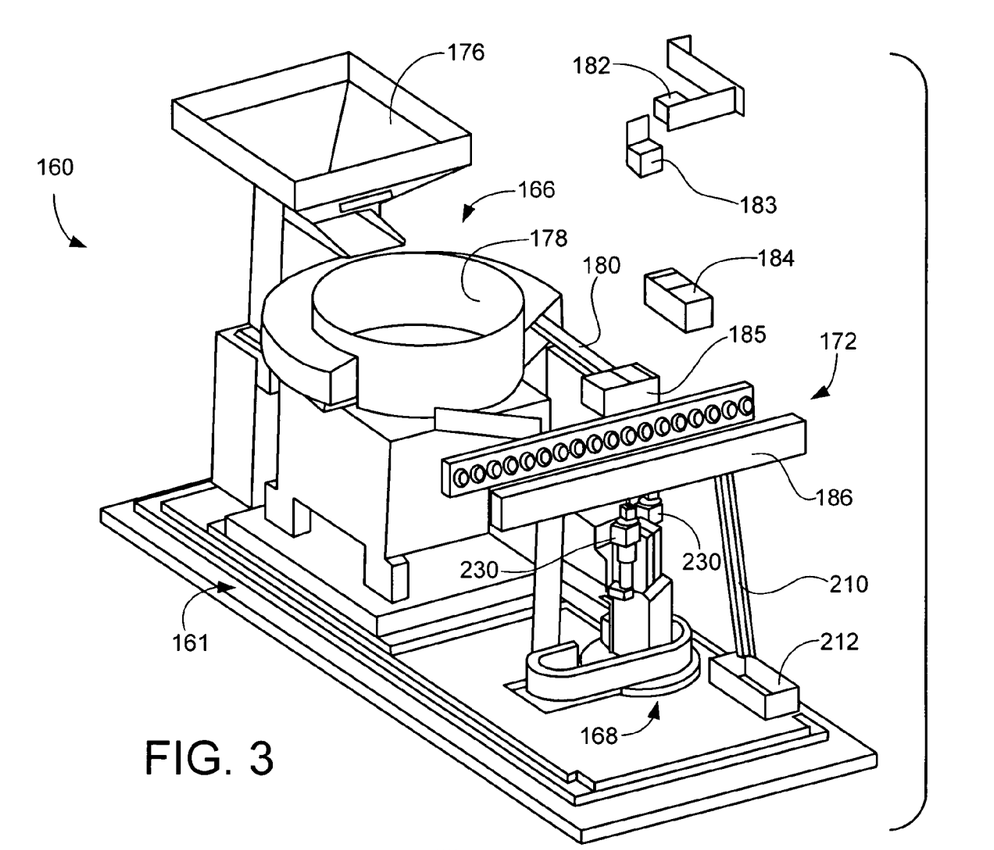
FIG. 3 is an isometric view of relevant portions of a shipping comb installation station configured to install the shipping comb of FIG. 2 onto the head stack assembly (HSA) of FIG. 1.
Figure 4:
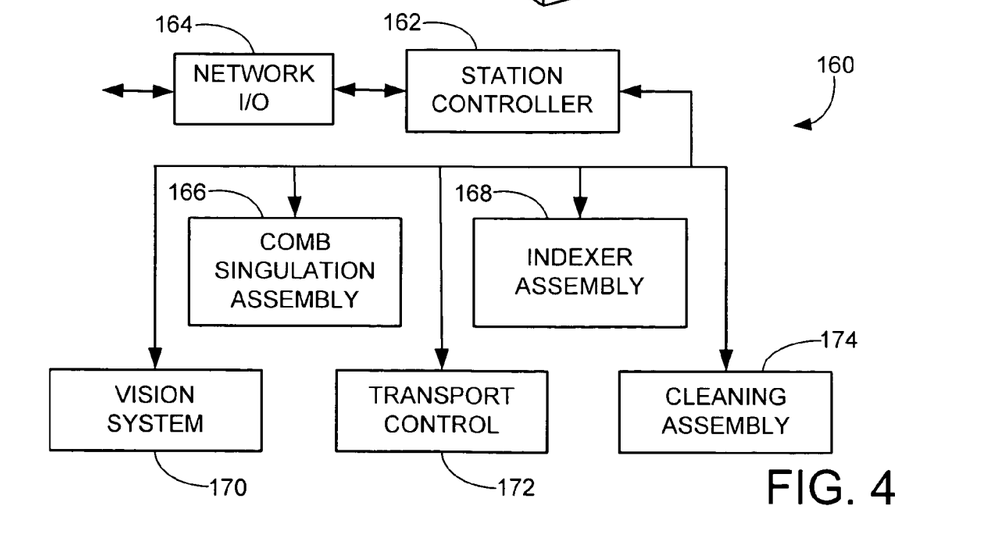
FIG. 4 provides a functional block representation of relevant portions of the installation station of FIG. 3.

FIGS. 3 and 4 set forth a shipping comb installation station 160 constructed and operated in accordance with preferred embodiments of the present invention. FIG. 3 provides a simplified isometric depiction of relevant portions of the station 160, and FIG. 4 shows a corresponding functional block representation of the station.

The station 160 forms a portion of the aforementioned automated assembly line, and operates to provide automated installation of a population of shipping combs such as shown in FIG. 2 onto corresponding HSAs 114 as shown in FIG. 1. It is contemplated that the HSAs are assembled by an upstream station and are sequentially presented to the station 160 on conveyorized pallets (not shown).

A comb 130 is installed onto each HSA 114 by the station 160. The pallets with the HSA/comb pairs are advanced to a downstream station where the HSAs 114 are installed onto corresponding base decks (such as 102 in FIG. 1), the transducers 112 are merged with the media 110, and the shipping combs 130 are removed. It is contemplated that the combs 130 are accumulated at this downstream station and periodically returned to the station 160 for reuse.

As shown in FIG. 3, the station 160 includes a base plate assembly 161 that is preferably supported by a frame (not shown) at a suitable elevation to align the station 160 with the aforementioned upstream and downstream stations.

A station controller 162 provides top level station control. The controller 162 preferably comprises a PC or PLC type device with a suitable graphical user interface (GUI). The controller 162 interfaces with a computer network via I/O block 164. This network is under the control of a top level controller (not shown) that directs overall operational flow of the assembly process and accumulates parametric data from the respective stations.

The station controller 162 directs the operation of various subsystems of the station 160, including a comb singulation assembly 166, an indexer assembly 168, a vision system 170, a transport control system 172, and a cleaning assembly 174.

The comb singulation assembly 166 generally operates to continually receive a large population of the combs 130 and to singulate, or separate, the combs for individual manipulation by the indexer assembly 168. With reference again to FIG. 3, the comb singulation assembly 166 preferably includes a hopper 176 into which a quantity of the combs 130 are periodically introduced. The hopper 176 feeds the combs 130 into a vibratory bowl 178.

The combs 130 are advanced from the bowl 178 onto a circumferentially extending singulation track 180, with each comb 130 on the track 180 having a substantially common orientation. The track 180 terminates at an escapement (not visible in FIG. 3) to allow the indexer assembly 168 to individually engage the engagement member 136 of each comb 130 in turn.

The vision system 170, also referred to herein as an inspection assembly, preferably includes a number of digital cameras 182, 183 and light sources 184, 185 which are mounted to the frame (not shown) to provide optical detection capabilities along multiple axes to obtain computerized video images of the comb 130.

The transport control system 172 includes a conveyor section 186 along which the pallets are controllably advanced and incorporates various sensors, motors, gates, etc. (not separately identified) to this end. Although not shown in FIG. 3, additional conveyor sections can be incorporated in parallel to the section 186 to accommodate multiple flow paths for the pallets such as, for example, a bypass return path.

Figure 5:
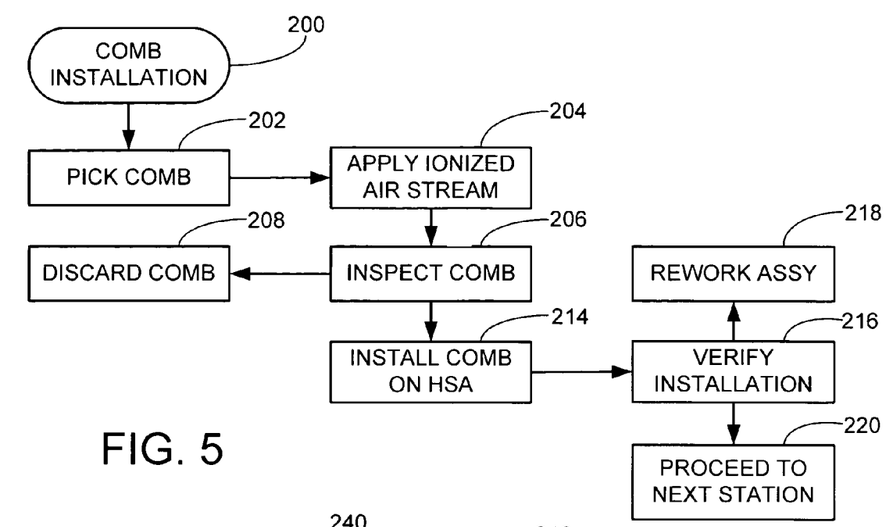
FIG. 5 is a generalized flow representation to set forth preferred sequential operation of the installation station of FIGS. 3 and 4.

Preferred operation of the station 160 is generally set forth by a flow routine 200 of FIG. 5. A pick comb operation is represented by step 202. During this step, the indexer assembly 168 operates to pick (remove) the comb 130 from the escapement portion of the track 180 and move the singulated comb 130 to a predetermined position.

An ionized air stream 204 is next preferably applied to the singulated comb 130 by the cleaning assembly 174. This advantageously serves to remove any contaminating particulates that may remain on the comb 130 after the vibratory operation of the hopper 178 and track 180.

The comb 130 is next visually inspected at step 206. This step is preferably carried out by the vision system 170 while the indexer assembly 168 orients the comb 130 at the predetermined position. This ensures the shipping comb 130 is not damaged and is in the proper orientation for installation.

During this inspection step 206, at least one, and preferably multiple physical parameters of the shipping comb 130 are detected, such as dimensions of various arms or other locations and surfaces of the combs, shading, color aspects, etc. The machine readable code (information 150) is also included in these detected physical parameters.

Should the comb 130 be found to be damaged by the operation of step 206, the flow of FIG. 5 continues to step 208 wherein the comb is discarded. Preferably, as shown in FIG. 3 the damaged comb 130 is dropped onto a discard chute 210 and the damaged comb 130 is accumulated in a discard bin 212.

As mentioned previously, the shipping comb information 150 from the comb 130 is preferably read during the inspection step 206. In this way, if a condition exists whereby this a particular comb 130 should not be used, the station controller 162 can direct the discarding of the comb 130 as discussed above. Reasons why a particular comb 130 might be discarded based on the information 150 include a determination that a particular lot of combs are defective or are out of revision, that the particular comb 130 is not suited for the associated HSA 114 present at the station 160, that a maximum number of uses of the comb (e.g., five) have already taken place, and so on.

The flow of FIG. 5 continues at step 214 wherein the comb 130 is installed onto the HSA 114. A detailed explanation of such installation will be provided below. Once installed, a second visual inspection step is preferably performed at step 216 by the vision system 170 to verify proper installation of the comb 130 onto the HSA 114.

If the inspection of step 216 determines that the shipping comb 130 has been improperly installed, the flow of FIG. 5 continues to step 218 and the assembly is identified for rework. Contrawise, if the comb 130 is verified as being successfully installed, the assembly is cleared for downstream processing by the next station, step 220.

To avoid bottlenecks within the automated line, each station is preferably provided with a common time budget to fully complete the operations associated with the station. It is contemplated that the flow of FIG. 5 is carried out on each HSA 114 within a time budget of on the order of four seconds.

Figure 6:
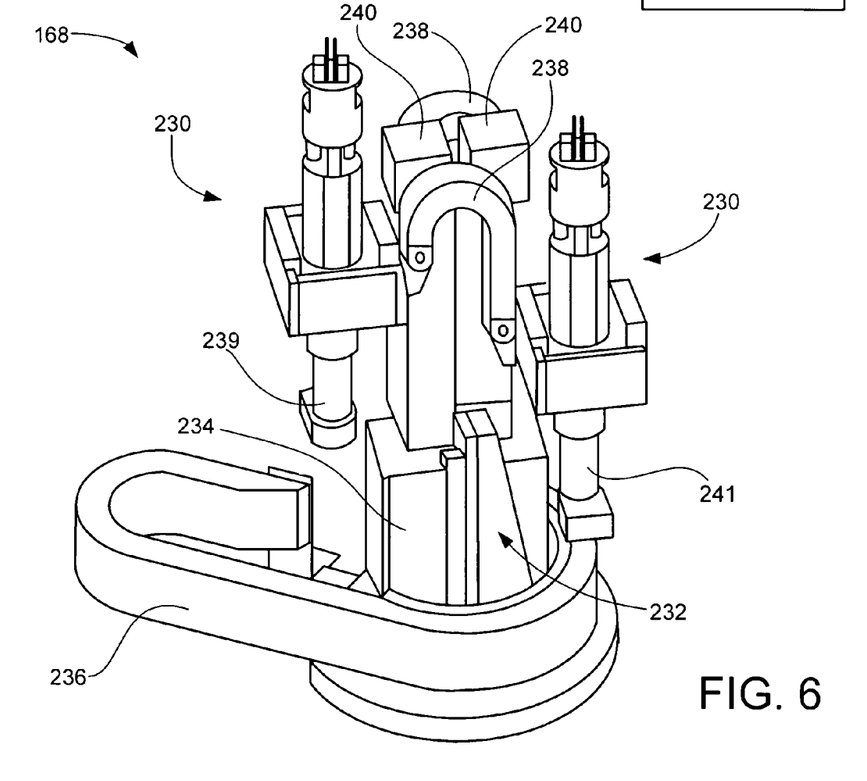
FIG. 6 is an isometric representation of the indexer assembly of FIGS. 3 and 4.

FIG. 6 shows the indexer assembly 168 in greater detail. A pair of robotic end effectors 230 are preferably mounted to opposing sides of a rotatable tower portion 232. A motor 234 operates in conjunction with a chain drive mechanism 236 to rotate the end effectors 230 between the pick and place positions described above.

More specifically, the indexer assembly 168 is configured so that one end effector 230 is adjacent the escapement portion of the vibratory track 180 (pick position) while the other end effector 230 is adjacent the HSA 114 (place position). The respective operations are carried out at these positions, after which the motor 234 rotates 180 degrees so that the end effectors 230 are brought to the other respective pick and place positions.

The motor 234 preferably reverses the rotational direction each time (e.g., clockwise, then counter-clockwise), although in alternative embodiments the motor 234 can be configured to selectively advance the end effectors 230 in a common rotational direction (e.g., clockwise each time).

Additional chain drive mechanisms 238 and motors 240 independently and selectively move the end effectors 230 up and down relative to the tower 232. Motors 239 and 241 independently and selectively rotate the respective end effectors 230 relative to the tower 232.

Figure 7:
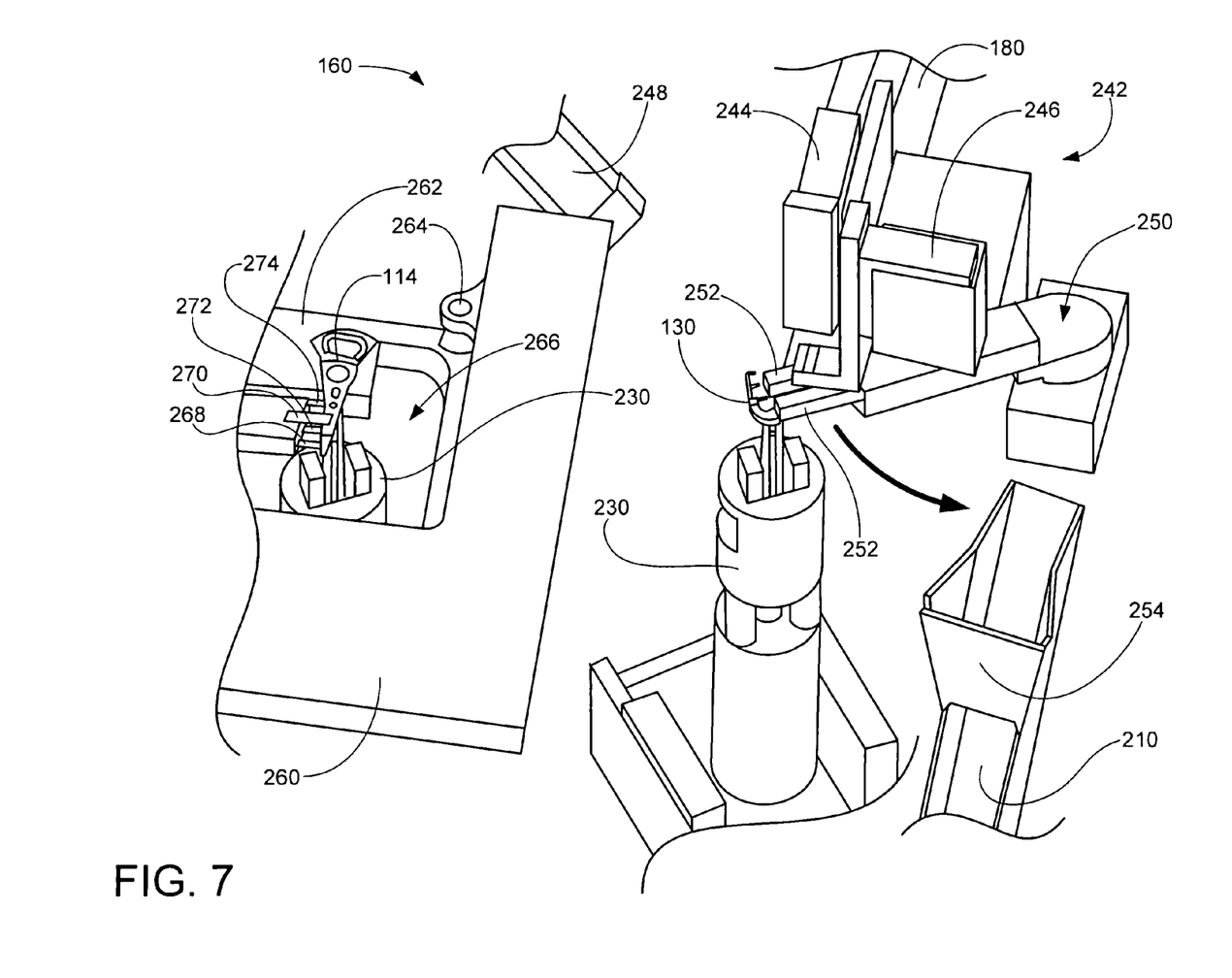
FIG. 7 shows additional detail of the installation station.

FIG. 7 shows relevant portions of the station 160 to provide additional detail with regard to the pick and place positions. The vibratory track 180 terminates at the aforementioned escapement portion, numerically denoted at 242. The escapement 242 includes first and second gate assemblies 244, 246 which successively separate the combs 130 for engagement by the associated end effector 230.

Once a comb 130 is removed from the escapement 242 by the end effector 230, the ionized air stream is applied via applicator 248 (step 204), and the comb is visually inspected (step 206). This is preferably carried out by camera 182 (FIG. 3) which is disposed over this location, and by a second camera (not shown) which provides a horizontal view of the singulated comb 130. The end effector 230 is preferably rotated by the associated motor 239, 241 so that the second camera obtains both side and end view images of the comb 130.

To discard the comb 130 (step 208 in FIG. 5), a cantilevered gripper arm 250 engages the pin 134 of the comb (FIG. 2) between a pair of opposing compliant jaws 252. The arm 250 then rotates and drops the rejected comb 130 into a guide portion 254 of the discard chute 210.

FIG. 7 further shows a datum plate 260 adjacent the place position (for reference, the datum plate was omitted from FIG. 3). A pallet is shown at 262. During operation, the pallet 262 is advanced along the conveyor 186 and then raised and clamped to the underside of the plate 260. Keyed pins such as at 264 are preferably used to locate the pallet 262 in a desired orientation.

The pallet 262 is shown to support an assembled HSA 114, and includes an aperture 266 to allow access to the HSA 114 from below. It will be appreciated that the stacked HSA 114 is preferably formed in an inverted manner so that the top of the HSA 114 is in facing relation to the pallet 262. Thus, the shipping comb 130 is inserted by the end effector 250 from underneath. The visual inspection of step 216 is preferably carried out by camera 183 from above.

For reference, in a subsequent station downstream from the station 160, the HSA 114 is inverted to the normal upright position shown in FIG. 1, merged with the media 110, and the shipping comb 130 is retracted upwardly from the HSA 114.

As mentioned previously, the HSA 114 is preferably a stacked actuator which is assembled on the pallet 262 by an upstream station. A number of staggered pallet keys 268, 270, 272 are sequentially laid down during this process and preferably remain interposed within the HSA 114 when the HSA reaches the station 160.

Figures 8, 9, 10:
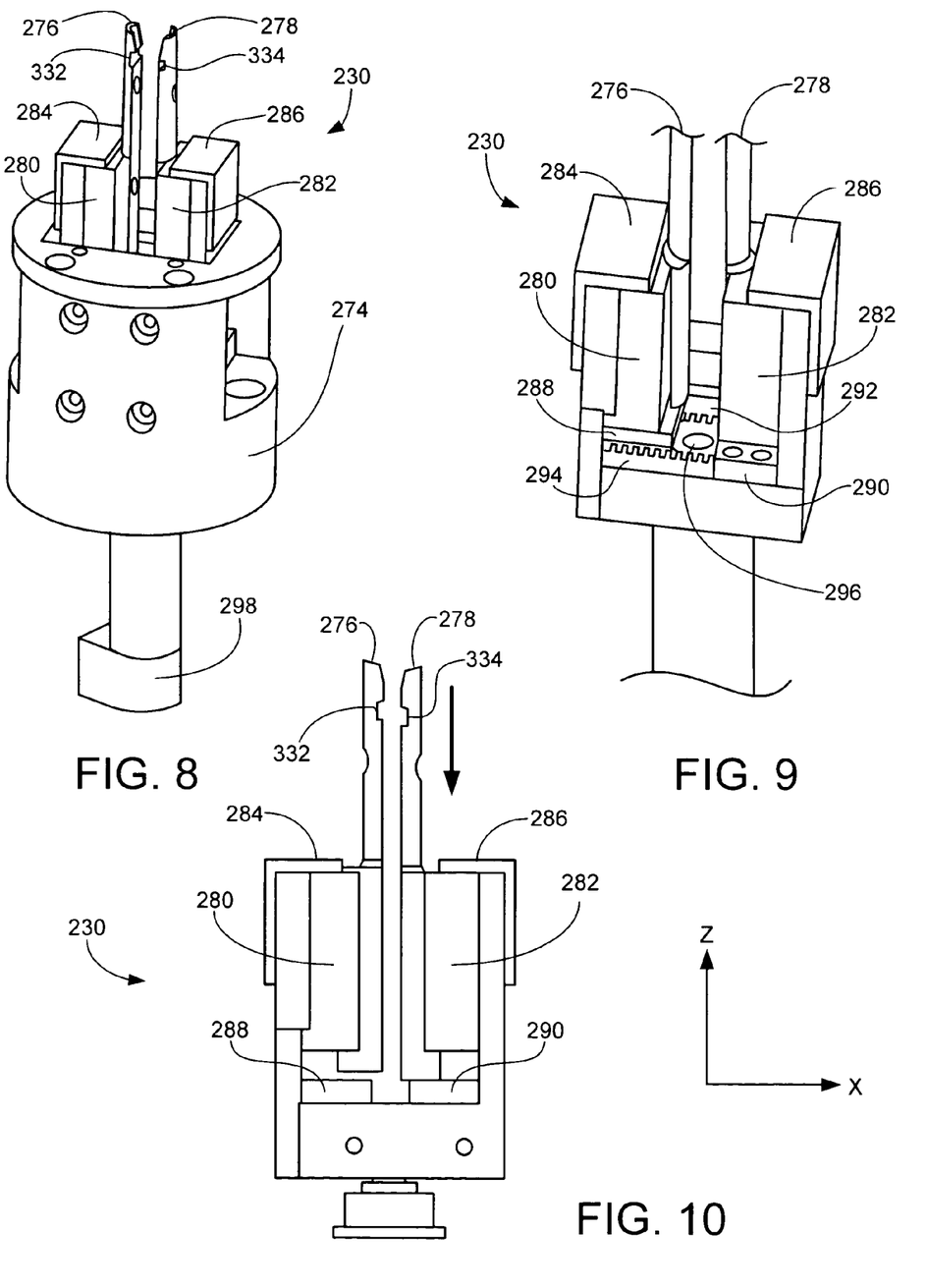
FIG. 8 shows an isometric view of a selected end effector of the indexer assembly.
FIG. 9 provides a cut-away view of FIG. 8.
FIG. 10 is an elevational view of interior portions of the indexer.

FIG. 8 shows relevant portions of a selected one of the end effectors 230 of FIG. 6. The end effector 230 includes a housing 274 from which extend a tandem pair of gripper fingers 276, 278. As further shown in FIGS. 9 and 10, the fingers 234 are respectively coupled to z-axis sliders 280, 282 to allow a limited amount of movement in the z-axis (vertical direction).

An internal coiled spring (not shown) is coupled to each of the fingers 276, 278 so that the fingers 276, 278 are nominally biased upwardly in the position shown by finger 276 in FIG. 10. The springs preferably provide a relatively low amount of force so that the fingers are easily deflected downwardly in the z-axis, as represented by finger 278 in FIG. 10. Upper limit stops 284, 286 and lower limit stops 288, 290 respectively provide rigid surfaces to serve as overall limits for the axial movement of the fingers 276, 278.

As best shown in FIG. 9, a rack and pinion arrangement is preferably used to advance the fingers 276, 278 toward and away from each other (i.e., along the x-axis). More specifically, slider 280 is affixed to a first rack 292 and slider 282 is affixed to a second rack 294. A pinion gear 296 engages the respective racks 292, 294 and is selectively rotated by a stepper motor 298. A closed loop servo control circuit (not shown) is provided to precisely advance and retract the fingers 276, 278.

It will now be understood that the indexer assembly 168 (FIG. 6) is preferably provided with at least nine degrees of freedom: (1) rotation of the respective end effectors 230 through an arc of 180 degrees between the pick and place positions; (2-3) individual z-axis movement of the respective end effectors 230 by way of drive mechanisms 238 and motors 240; (4-5) individual rotation of the respective end effectors 230 by way of motors 239 and 241; (6-7) z-axis compliance of the fingers 276, 278 of the respective end effectors 230; and (8-9) x-axis movement of the fingers 276, 278 of the respective end effectors 230. Suitable feedback and control circuitry is provided to accommodate and control these respective ranges of motion.

Figure 11:
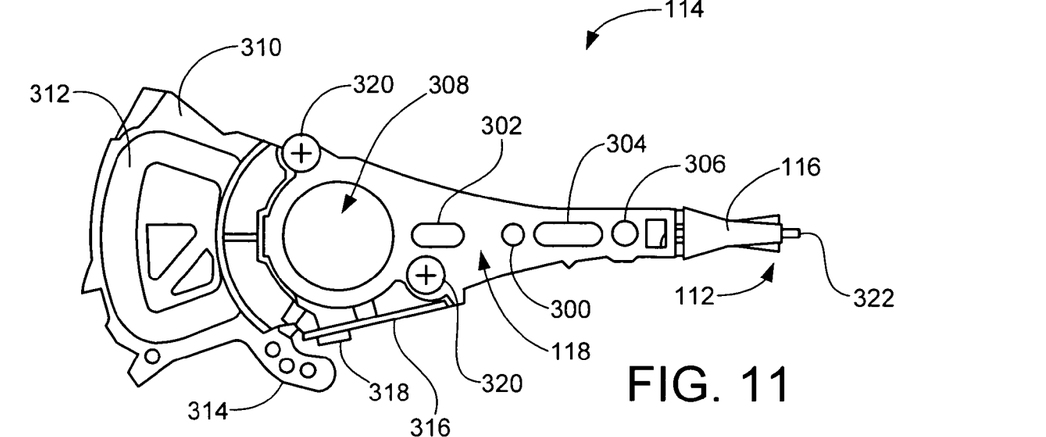
FIG. 11 provides a top plan view of the HSA of FIG. 1.

Additional details with regard to the preferred insertion sequence will now be discussed. FIG. 11 shows a top plan view of the HSA 114. Features of interest include shipping comb insertion apertures 300 which extend through each of the actuator arms 118 to accommodate the shipping comb pin 134. Conventional lightening holes are additionally preferably provided at 302, 304 and 306. It will be appreciated that other configurations, including configurations with different hole patterns and configurations without holes at all can readily be utilized as desired.

A bearing cartridge aperture 308 accommodates the bearing assembly 120 (FIG. 1). A yoke portion 310 supports a coil 312 of the VCM 122, and a flex support arm 314 supports and guides flex circuit portions of the flex assembly 124. A preamp board 316 of the flex assembly 124 is preferably mounted to the side of the HSA 114 and supports a preamplifier/driver circuit device 318.

Fasteners 320 preferably engage and clamp the HSA 114 to form an integrated assembly, although other configurations can be utilized as well. Each of the transducers 112 preferably includes a load tab 322 to facilitate ramp load/unload operations by the device 100. In this way, the transducers 112 can be safely parked on a ramp structure (not shown in FIG. 1) at times of device deactivation.

Figure 12:
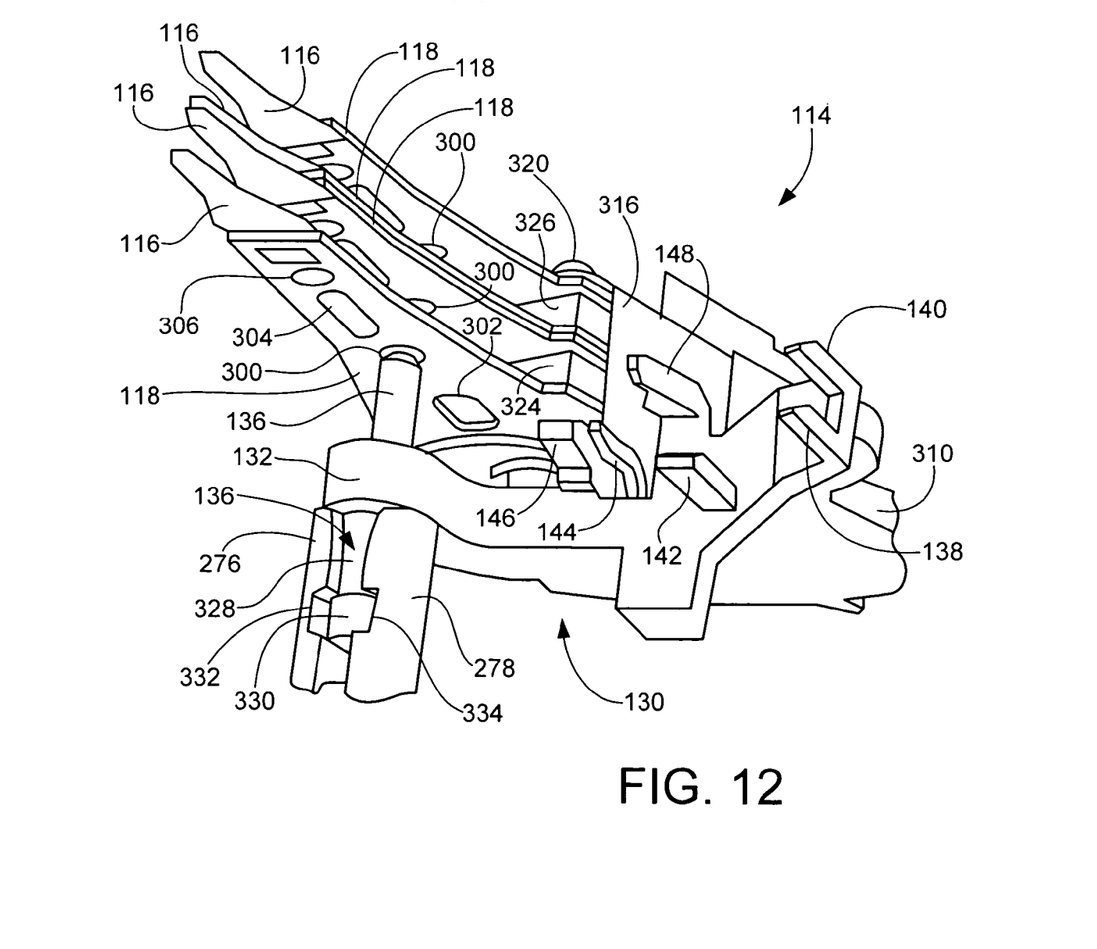
FIG. 12 shows an isometric view of the end effector and the HSA during initial stages of installation of the shipping comb onto the HSA.

As further depicted by FIG. 12, the HSA 114 is formed from four nominally identical actuator arms 118. Each arm 118 is preferably stamped from stainless steel, and supports a corresponding one of the flexures 116. The middle two arms are mounted together to form a single composite arm. A pair of spacers 324, 326 are interposed between the arms 118 to provide the requisite separation to accommodate the media 110. Preferably, the spacer 326 includes the yoke 310, coil 312 and flexure support arm 314 of FIG. 11.

Referring again to FIG. 2, the engagement member 136 of the shipping comb 130 preferably comprises an elongated post section 328 which supports a slightly larger flange portion 330 at a distal end thereof. As best shown in FIG. 10, recesses 332, 334 are preferably formed in the respective gripper fingers 276, 278 of the assembly station 160. As shown in FIG. 12, the recesses 332, 334 are preferably sized to engage the portion 330 of the comb in a desired orientation.

An elongated extension 336 of the portion 330 helps to ensure that the shipping comb 130 is maintained in a desired angular orientation relative to the fingers 276, 278. It will be understood that the fingers 276, 278 initially grasp the flange portion 330 in this way at the pick position and generally maintain this orientation until the comb 130 is released at the place position, except as noted below.

Figure 13:
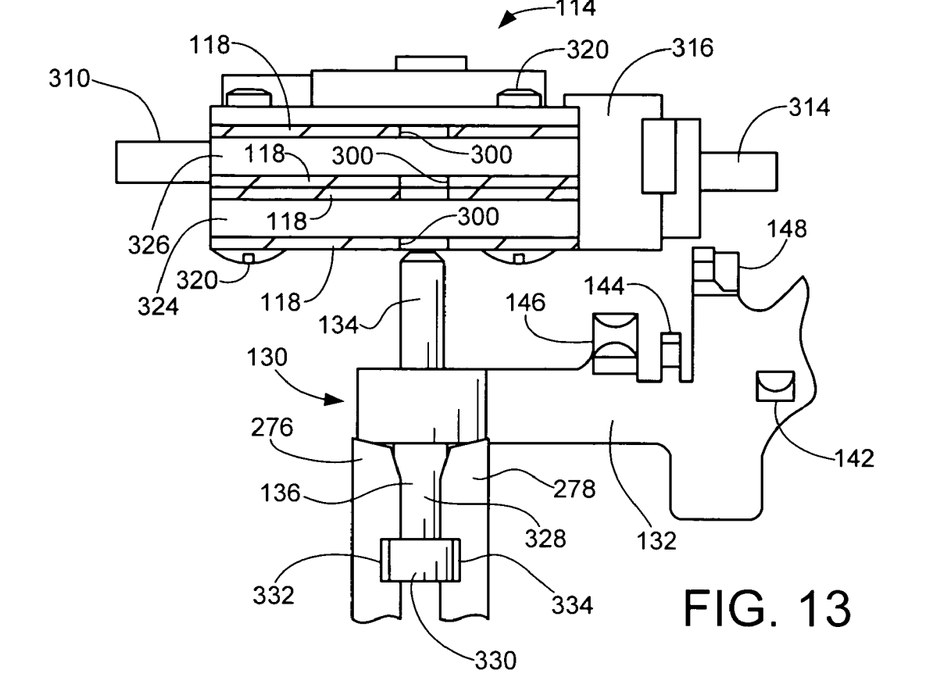
FIG. 13 provides an elevational, partial cross-sectional view of FIG. 12.
Figure 14:
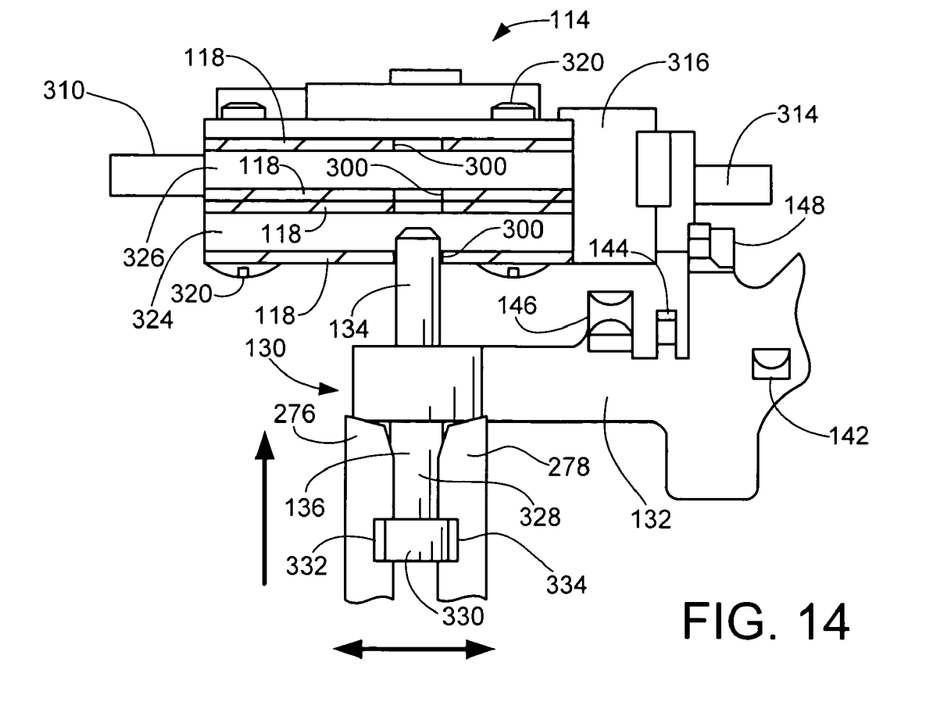
FIG. 14 provides an elevational, partial cross-sectional view to illustrate continued installation of the shipping comb.

During the insertion step 214 of FIG. 5, the fingers 276, 278 rapidly advance the shipping comb 130 upwardly to a position adjacent the lowermost arm 118, as depicted in FIGS. 12 and 13. At this point, and while the shipping comb 130 continues to move upwardly, the fingers 276, 278 are preferably opened slightly; that is, moved apart in the x-axis direction, as shown in FIG. 14. This provides a slight amount of x-y compliance to the shipping comb 130, in addition to the z-axis compliance provided by sliders 280, 282, allowing the comb to gimbal by a selected, controlled amount in multiple axes during insertion.

Such gimballing of the comb 130 is not necessarily required, but has been found advantageous because of the associated reduction of insertion force encountered by the HSA 114. Relaxing the grip of the fingers 276, 278 upon the shipping comb 130 serves to generally decouple the mass of the end effector 230 from the comb so that the insertion force is generally limited to the mass of the comb 130. This generally allows a faster insertion cycle time.

Moreover, because the arms 118 are preferably stamped, the pin apertures 300 may each have a sharp break transition which, if sufficient force is applied, may tend to shave off particulates from the chamfered end of the pin 136. Thus, allowing a slight amount of gimballing of the comb 130 in this manner preferably allows the insertion operation to take place faster with reduced risk of damage to the HSA 114 and to the comb 130.

Figure 15:
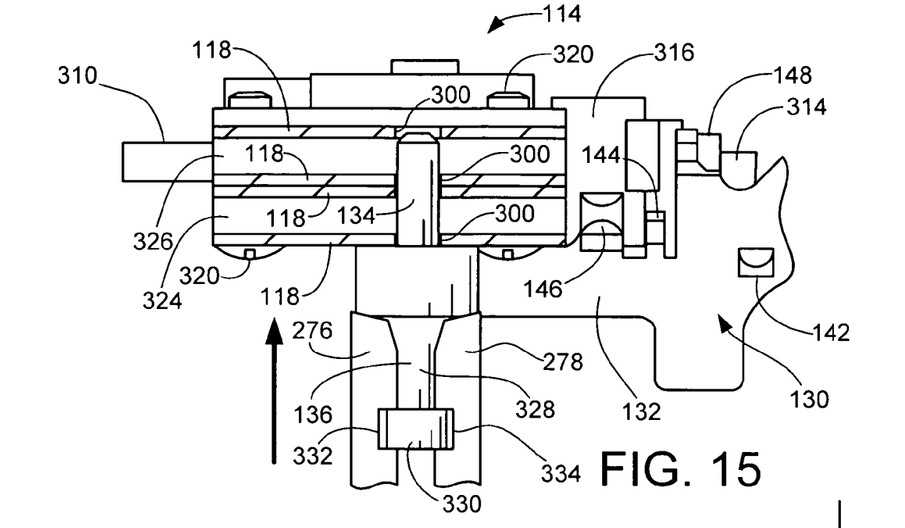
FIG. 15 provides another elevational, partial cross-sectional view with the shipping comb fully seated onto the HSA.

FIG. 15 shows the comb 130 in a fully seated position with respect to the HSA 114. It will be noted that the pin 134 does not extend through the pin aperture 300 of the bottom arm (the bottom arm being the topmost arm in FIG. 15 due to the aforementioned inversion of the HSA 114). In alternative embodiments, the pin 134 can be elongated (or shortened) as desired depending on the needs of a given application.

Preferably, the current applied to the associated motor 240 during the insertion process is monitored and compared to a current limit threshold. If this threshold is reached, the insertion process is aborted and the comb 130 is retracted. The station controller 162 notifies the network controller of the adverse condition, allowing the HSA 114 to be redirected downstream for appropriate actions.

Moreover, in a preferred embodiment the insertion current profile is sampled and reported to the network controller irrespective of whether the rejection threshold is reached. This information, along with information gleaned from various other operations, is stored for future reference and trend analysis.

In this way, should a subsequent failure event occur during manufacturing or field use, failure analysis and reliability monitoring may be able to tie the failure event back to an anomalous insertion of the shipping comb (e.g., a spike or other anomalous current event in the profile may indicate a bad batch of shipping combs, etc.) or other event during the operation of the station 160.

Once the comb 130 is fully seated as shown in FIG. 15, ramp support members 340 (FIG. 16) are automatically rotated to engage the load tabs 322 (FIG. 11) of the respective transducers 112. The ramp support members 340 support the flexures 116 and allows the automated retraction of the various pallet keys, at least including the keys 268 from the flexures 116.

Figure 16:
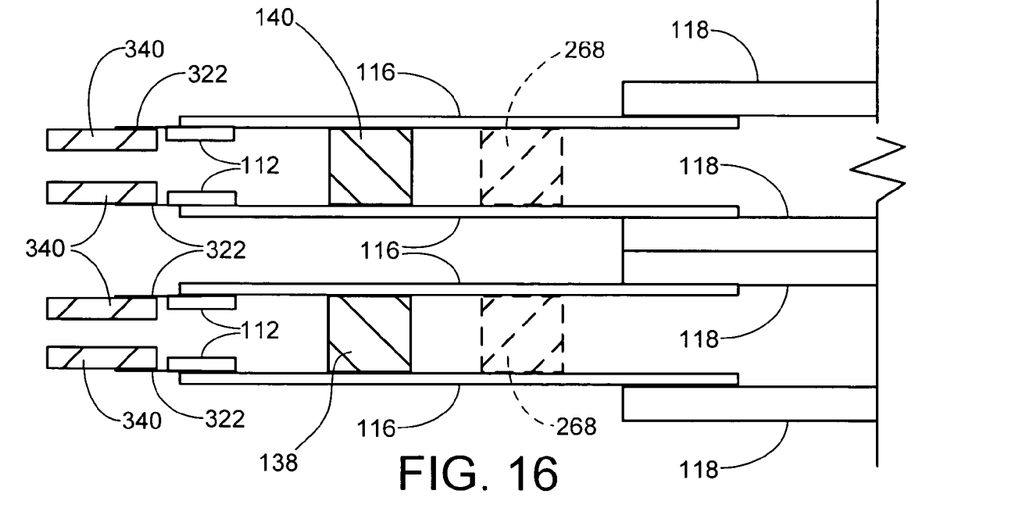
FIG. 16 provides an elevational, schematic depiction of the shipping comb in an installed position after rotation from the position of FIG. 12.
Figure 17:
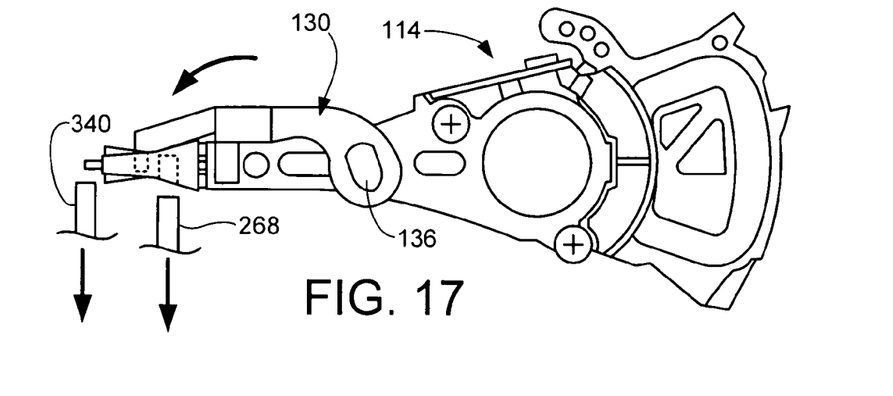
FIG. 17 shows a top plan representation of the shipping comb in the orientation of FIG. 13, as well as retraction of the manufacturing support fingers and ramp load supports of FIG. 16.

The end effector 230 is then rotated (via respective motor 239 or 241) to bring the flexure support arms 138, 140 into supporting engagement with the flexures 116, as shown in FIG. 16. The various arms 142, 144, 146 and 148 of the comb 130 also engage the HSA 114 during this rotation, resulting in the final orientation shown in FIG. 17 (bottom up view).

The various preferred embodiments presented herein provide several advantages over the prior art. Visual inspection of the combs both before and after installation, while not required, advantageously verify proper installation of the shipping comb 130 onto the HSA 114. Detection of the machine readable code from the comb information 150 during one (or both) of these steps further allows information to be gathered with regard to that particular shipping comb, which allows the comb to be discarded as necessary prior to installation.

The cleaning operation provided by the assembly 174 helps to ensure undesired particulates from the combs or from other sources are transferred to the HSA 114. The gimballing operation preferably allows the insertion process to be carried out quickly with reduced potential for damage to the HSA 114 and/or the comb 130. Monitoring of the insertion force by way of the current profile further allows the insertion force to be measured during insertion for future reference and failure analysis efforts. Also, variations with regard to inspection criteria, insertion force and insertion technique, etc. are substantially eliminated.

While preferred embodiments have been directed to the installation of a shipping comb onto an HSA, it will be appreciated that this is merely exemplary in nature, and is in no wise limiting to the scope of the claimed subject matter. Rather, the disclosed system can readily be adapted for any number of environments wherein support members are placed onto flexible elements.

It will thus be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

In addition, although the embodiments described herein are generally directed to a disc drive automated assembly process, it will be appreciated by those skilled in the art that the claimed subject matter is not so limited and various other applications and environments can readily be utilized without departing from the spirit and scope of the claimed invention.

What is claimed is:

1. An apparatus comprising a robotic end effector configured to insert a support member to bias a flexible element, a controller adapted to, during said insertion, monitor an insertion force applied by the end effector against the flexible element in relation to a current applied to a motor coupled to the end effector, and an inspection assembly coupled to the end effector which, prior to said insertion, verifies at least one physical parameter of the member while the member is supported by the end effector.

2. The apparatus of claim 1, wherein the inspection assembly comprises a vision system which obtains a computerized video image of the support member along at least one axis.

3. The apparatus of claim 2, wherein the vision system further decodes a machine readable code on the support member from said video image.

4. The apparatus of claim 1, wherein the inspection assembly comprises a vision system which obtains respective video images of the support member along multiple axes, wherein at least two of said video images are obtained from a single image device through rotation of the support member by the end effector.

5. The apparatus of claim 1, wherein the inspection assembly further obtains a second video image of the support member after insertion by the end effector.

6. The apparatus of claim 1, further comprising a singulation assembly which individually presents each of a population of nominally identical ones of the support member to the end effector.

7. The apparatus of claim 1, the controller being further adapted to direct the end effector to abort said insertion and discard the support member responsive to said at least one physical parameter of the member detected by the inspection assembly.

8. The apparatus of claim 1, wherein the controller compares said monitored current to a predetermined threshold and interrupts further insertion of the support member responsive to said monitored current reaching said threshold.

9. The apparatus of claim 1, wherein the end effector comprises a pair of opposing gripper fingers which engage an engagement member portion of the support member, wherein the gripper fingers initially engage the engagement member with a selected compressive force and subsequently move apart to allow the support member to gimbal during installation while the support member remains supported by the gripper fingers.

10. The apparatus of claim 1, further comprising a cleaning assembly which performs a cleaning operation upon the support member while the end effector supports the support member and prior to installation of said support member.

11. A method comprising steps of:
using a robotic end effector to insert a support member to bias a flexible element, the end effector comprising a pair of opposing gripper fingers which engage opposite sides of the support member with an initial compressive force and subsequently move apart to decouple a mass of the end effector from a mass of the support member and allow the support member to gimbal during said insertion against the flexible element while the support member remains supported by the gripper fingers; and utilizing an inspection assembly to, prior to said insertion, verify at least one physical parameter of the member while the member is supported by the end effector with the initial compressive force.

12. The method of claim 11, wherein the utilizing step comprises obtaining a computerized video image of the support member along at least one axis.

13. The method of claim 11, wherein the utilizing step comprises obtaining video images of the support member along multiple axes, wherein at least two of said video images are obtained from a single image device through rotation of the support member by the end effector.

14. The method of claim 11, wherein the utilizing step further comprises decoding a machine readable code on the support member from a video image obtained by said inspection assembly.

15. The method of claim 11, further comprising a prior step of singulating the support member from a population of nominally identical ones of the support member for presentation to the end effector.

16. The method of claim 11, further comprising monitoring a motor current applied to a motor used to advance the end effector during the using step to detect an insertion force applied by the support member against said flexible element.

17. The method of claim 16, wherein the monitoring step comprises comparing said monitored current to a predetermined threshold and interrupting further insertion of the support member when said monitored current reaches said threshold.

18. An apparatus comprising a singulation assembly individually presenting each of a population of nominally identical support members, a robotic end effector configured to grasp a selected support member presented by the singulation assembly and to insert the selected support member against a flexible element, an inspection assembly coupled to the end effector which, prior to said insertion, verifies at least one physical parameter of the support member while the support member is supported by the end effector, and a controller adapted to direct the end effector to abort said insertion and discard the support member responsive to said at least one physical parameter of the member detected by the inspection assembly.

19. The apparatus of claim 18, further comprising a motor adapted to advance the end effector in a direction toward the flexible element, and a controller adapted to monitor an insertion force applied against the flexible element by the support member in relation to a magnitude of current applied to the motor, the controller aborting said insertion responsive to the magnitude of current reaching a predetermined threshold current level.

20. The apparatus of claim 18, wherein the end effector comprises a pair of opposing gripper fingers which engage an engagement member portion of the support member, wherein the gripper fingers initially engage the engagement member with a selected compressive force and subsequently move apart to allow the support member to gimbal during installation while the support member remains supported by the gripper fingers.

* * * * *